US010333933B2

(12) United States Patent
Vishwanath et al.

(10) Patent No.: US 10,333,933 B2
(45) Date of Patent: *Jun. 25, 2019

(54) COMMUNICATING NOTIFICATIONS FROM A THIRD PARTY SYSTEM TO ONLINE SYSTEM USERS VIA THE ONLINE SYSTEM

(71) Applicant: Facebook, Inc., Menlo Park, CA (US)

(72) Inventors: Tirunelveli R. Vishwanath, Sunnyvale, CA (US); Vijaye Ganesh Raji, Redmond, WA (US); James J. Yu, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,291

(22) Filed: Jan. 30, 2018

(65) Prior Publication Data

US 2018/0152449 A1 May 31, 2018

Related U.S. Application Data

(63) Continuation of application No. 14/641,295, filed on Mar. 6, 2015, now Pat. No. 9,961,080.

(51) Int. Cl.
*H04L 29/06* (2006.01)
*H04L 12/58* (2006.01)
*H04L 29/08* (2006.01)

(52) U.S. Cl.
CPC .......... *H04L 63/0876* (2013.01); *H04L 51/14* (2013.01); *H04L 51/24* (2013.01);
(Continued)

(58) Field of Classification Search
CPC ... H04L 63/0876; H04L 51/14; H04L 67/306; H04L 67/20; H04L 67/26; H04L 51/24; H04L 63/102
See application file for complete search history.

(56) References Cited

U.S. PATENT DOCUMENTS

2007/0287420 A1* 12/2007 Kirke ................ H04L 29/12113
455/411
2011/0138171 A1 6/2011 Yildiz
(Continued)

OTHER PUBLICATIONS

United States Office Action, U.S. Appl. No. 14/641,295, dated May 8, 2017, twelve pages.
(Continued)

*Primary Examiner* — Meng Li
(74) *Attorney, Agent, or Firm* — Fenwick & West LLP

(57) ABSTRACT

To allow a third party system to more particularly identify sets of users for distributing content, an online system receives data from a third party system identifying users of the online system who have authorized communication with the third party system and stores information authorizing communication between the third party system and the users in user profiles associated with the user. The online system receives a request from the third party system to transmit a notification to online system users satisfying criteria specified by the request. User profiles including information authorizing communication between the third party system and online system users are identified by the online system, which selects a set of the identified user profiles associated with information satisfying the criteria specified by the request. The online system transmits the notification to client devices associated with users associated with the set of the identified user profiles.

20 Claims, 2 Drawing Sheets

(52) U.S. Cl.
CPC ............ *H04L 63/102* (2013.01); *H04L 67/20* (2013.01); *H04L 67/26* (2013.01); *H04L 67/306* (2013.01)

(56) References Cited

U.S. PATENT DOCUMENTS

| | | |
|---|---|---|
| 2011/0154445 A1 | 6/2011 | Schmidt-Karaca et al. |
| 2012/0089698 A1 | 4/2012 | Tseng |
| 2012/0278475 A1 | 11/2012 | Papakipos et al. |
| 2013/0080526 A1* | 3/2013 | Gill ........................ G06Q 10/10 709/204 |
| 2014/0122715 A1 | 5/2014 | Rowe |
| 2014/0237236 A1* | 8/2014 | Kalinichenko ......... G06F 21/43 713/168 |

OTHER PUBLICATIONS

United States Office Action, U.S. Appl. No. 14/641,295, dated Oct. 17, 2016, thirteen pages.
United States Office Action, U.S. Appl. No. 14/641,295, dated Apr. 22, 2016, fourteen pages.

\* cited by examiner

COMMUNICATING NOTIFICATIONS FROM A THIRD PARTY SYSTEM TO ONLINE SYSTEM USERS VIA THE ONLINE SYSTEM

CROSS REFERENCE TO RELATED APPLICATIONS

This application is a continuation of U.S. application Ser. No. 14/641,295, filed Mar. 6, 2015, which is incorporated by reference in its entirety.

BACKGROUND

This disclosure relates generally to communicating content to online system users, and more specifically to identifying users to receive content from a third party system based on information maintained by an online system.

An online system, such as a social networking system, allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for third party systems to distribute content to users. For example, third party systems may communicate messages identifying products or services by presenting content to online system users via an online system.

However, many applications executing on client devices and presenting content to users process content received by a client device to identify unwanted messages, for example, by applying one or more filters to the received content. Based on application of the filters, certain content may be stored instead of presented to a user by the client device. For example, content from a third party system satisfying certain filter criteria is placed in a particular folder of the application, while other content that does not satisfy the certain filter criteria is presented to the user by the application. However, filtering of content may generate false positives that erroneously prevent presentation of content by an application.

Certain applications present notifications to a user when the application receives content from a third party system. A notification is presented by a client device executing the application to indicate that the application has received content, prompting a user to access the application and view the content. For example, a notification presents a visual indication on a client device that an application has received content to cause a user to access the application and view the content. To regulate information presented by a client device, a user authorizes an application to present notifications via the client device, which limits the type and number of notifications presented by the client device. While notifications allow a third party system to increase the likelihood of a user viewing content, because many third party systems maintain a limited amount of information associated with users, limiting the ability of the third party system to select to receive various content. This reduces the amount and type of content identified to a user via notifications associated with applications.

SUMMARY

An online system, such as a social networking system, maintains a user profile associated with each user of the online system. A user profile associated with a user includes information describing the user (e.g., demographic information), and may be associated with actions performed by the user as well as connections between the user and additional users of the online system. Additionally, a user of the online system may authorize communication between a client device associated with the user and a third party system, allowing content to be communicated between the client device and the third party system. For example, the third party system communicates notifications to one or more client devices associated with users of the third party system. A notification is information from the third party system presented by a client device authorized by its associated user to communicate with the third party system. For example, a notification from the third party system is presented by a client device executing an application associated with the third party system to indicate the application has received content from the third party system, prompting a user to access the application and view the content. The notification may include the content from the third party system or a subset of the content from the third party system. Alternatively, the notification may be a prompt that retrieves content from the third party system when the user interacts with the prompt. In various embodiments, the third party system maintains limited information associated with the user, which limits the ability of the third party system to identify various sets of users having different characteristics.

To allow a third party system to more particularly identify sets of users for distributing content, the online system receives data from a third party system identifying users of the online system who have authorized communication with the third party system. In various embodiments, the online system receives a device identifier of a client device from the third party system and information associated with the third party system authorizing communication between the client device corresponding to the device identifier and the third party system. The online system identifies a user profile maintained by the online system including the device identifier and stores the information authorizing communication between the client device corresponding to the device identifier and the third party system in the user profile. Storing the information authorizing communication between the client device and the third party system allows the online system to identify users who have authorized communication with the third party system. For example, the online system receives a token from the third party system authorizing communication between a client device and the third party system and a device identifier associated with the token. The online system then stores the token in a user profile maintained by the online system that includes the device identifier.

Based on information associated with its users, the online system may transmit notifications from the third party system to various users of the online system. Because the online system maintains various types of information associated with its users, the online system may identify users based on criteria specified by the third party system and communicate notifications from the third party system to users satisfying the criteria, allowing the third party system to more particularly identify users to receive notifications without allowing the third party system to access information associated with the users by the online system. By transmitting notifications for the third party system to the identified users, the online system maintains the privacy of its users from the third party system. Hence, the online system receives a request from the third party system to communicate a notification to users of the online system satisfying at least a threshold number of criteria included in the request. The criteria specify one or more characteristics of users eligible to be presented with a notification included in the request or otherwise identified by the third party system. Associating different criteria with different notifications allows the third party system to customize presentation of various notifications to users of the online system who authorized communication with the third party system and who have specific characteristics, allowing notifications including different content to be presented to users of the online system.

The online system identifies user profiles associated with its users that include information authorizing communication between the third party system and a client device corresponding to a device identifier in the user profile and selects a set of the identified user profiles associated with characteristics satisfying at least the threshold number of criteria included in the request. The notification is communicated by the online system to client devices associated with users associated with the set of identified user profiles. For example, the online system transmits the notification to a client device corresponding to a device identifier in an identified user profile that is associated with information authorizing communication between a client device and the third party system. In some embodiments, the online system communicates a confirmation to the third party system that the notifications have been sent to users associated with the identified user profiles. The online system may select a communication channel used to communicate a notification to a user associated with an identified user profile. For example, the online system retrieves information form an identified user profile specifying one or more communication channel preferences or describing usage histories of various communication channels by the user associated with the identified user profile and selects a communication channel for transmitting the notification to the user based on the information retrieved from the identified user profile.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
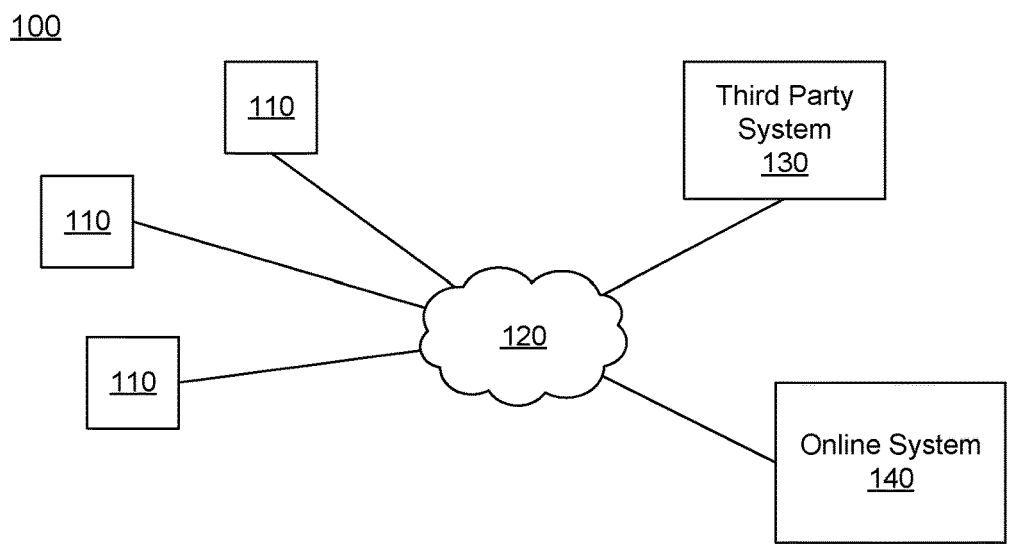
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems as well.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In various embodiments, a third party system 130 communicates notifications to one or more client devices 110 associated with users of the third party system 130. A notification is information from the third party system 130 presented by a client device 110 authorized by its associated user to communicate with the third party system 130. For example, a notification from the third party system 130 is presented by a client device 110 executing an application associated with the third party system 130 to indicate the application has received content from the third party system 130, prompting a user to access the application and view the content. The notification may include the content from the third party system 130 or a subset of the content from the third party system 130. Alternatively, the notification may be a prompt that retrieves content from the third party system 130 when the user interacts with the prompt. For example, a notification presents a visual indication on a client device 110 that an application associated with the third party system 130 has content for presentation to a user to cause the user to access the application associated with the third party system 130 and view the content via the client device 110.

To communicate a notification to a client device 110, the third party system 130 receives a device identifier associated with the client device 110 and generates information authorizing communication between the client device 110 and the third party system 130. In some embodiments, the third party system 130 stores the device identifier in association with the information authorizing communication between the client device 110 and the third party system 130. The third party system 130 communicates the information authorizing communication between the client device 110 and the third party system 130 to the client device, which stores the information. For example, the third party system 130 generates a token associated with a device identifier of a client device 110 and communicates the token to the client device 110 for storage. When the third party system 130 communicates a notification to the client device 110, the token (or other information authorizing communication between the client device 110 and the third party system 130) is included in the notification, allowing the client device 110 to verify the notification is from the third party system 130; for example, the client device 110 compares a token in the notification to a token from the third party system 130 stored by the client device 110 to verify the notification is from the third party system 130.

Figure 2:
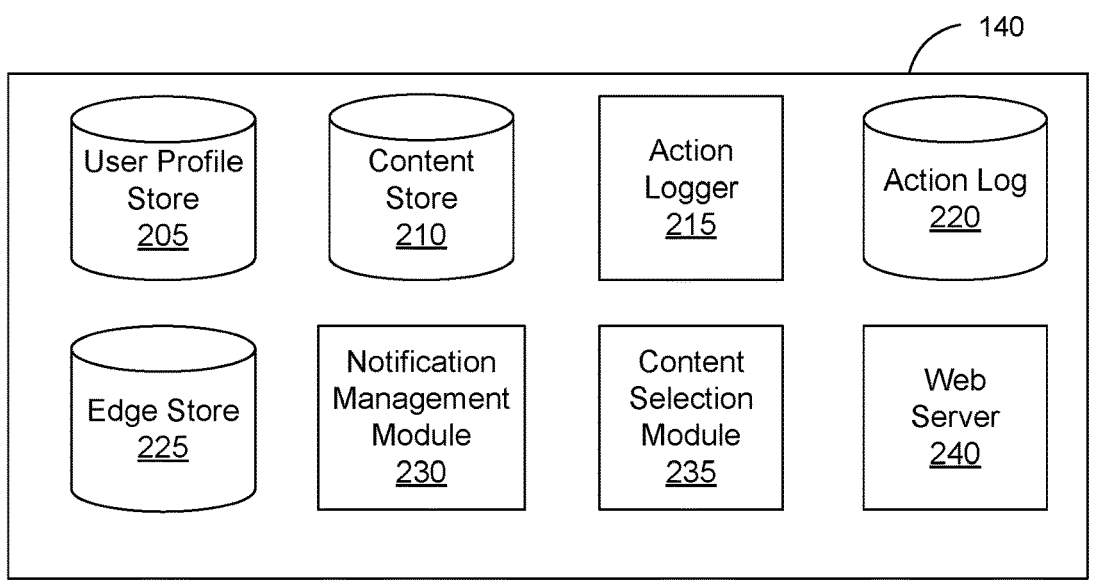
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a notification management module 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture. In one embodiment, the online system 140 is a social networking system.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

Certain objects in the content store 210 may be identified as associated with one or more applications. For example, an object associated with an application is an advertisement identifying the application. As another example, an object associated with a gaming application is a web page describing the gaming application. The web page may include a link for purchasing the gaming application, an image showing the gaming application, text describing installation or use of the gaming application, etc. Alternatively and additionally, an object related to an application may be group associated with the application and including one or more users of the online system 140. As another example, an object identifies an item for use within the application as well as a price specifying an amount of compensation to a third party system 130 associated with the application to allow a user to use the item when interacting with the application. For example, an object identifies a virtual currency spent within an application to provide a user with additional features as well as an amount of actual currency provided to a third party system 130 associated with the application to obtain the virtual currency. However, any other suitable type of object may be associated with an application and maintained in the content store 210. For example, content posted to the online system 140 identifying an application or relating to the application is identified as associated with the application or an invitation related to the application are identified as associated with the application. In various embodiments, an application identifier specifying an application is associated with an object associated with the application to allow the online system 140 to identify objects associated with the application.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The notification management module 230 receives data from a third party system 130 identifying users of the online system 140 who have authorized communication between the users and a third party system 130. In various embodiments, the notification management module 230 receives a device identifier of a client device 110 from the third party system 130 and information associated with the third party system 130 authorizing communication between the client device 110 corresponding to the device identifier and the third party system 130. The notification management module 230 retrieves a user profile from the user profile store 205 including the device identifier and stores the information authorizing communication between the client device 110 corresponding to the device identifier and the third party system 130 in the user profile, allowing the online system 140 to identify users who have authorized communication with the third party system 130. For example, the notification management module 230 receives a token from the third party system 130 authorizing communication between a client device 110 and the third party system 130 and a device identifier associated with the token. The notification management module 230 identifies a user profile including the device identifier and stores the token in the identified user profile.

Alternatively, the notification management module 230 receives an application-specific identifier of a user of an application associated with the third party system 130 from the third party system 130 and information associated with the third party system 130 authorizing communication between the application corresponding to the device identifier and the third party system 130 when the user corresponding to the application-specific identifier accesses the application. The notification management module 230 retrieves a user profile from the user profile store 205 including the application-specific identifier and stores the information authorizing communication between the application-specific identifier and the third party system 130 in the user profile, allowing the online system 140 to identify users who have authorized communication with the third party system 130 via the application and correspond to the application-specific identifier. Examples of application-specific identifiers are described in U.S. patent application Ser. No. 14/458,210, filed on Aug. 12, 2014, which is hereby incorporated by reference in its entirety. For example, the notification management module 230 receives a token from the third party system 130 authorizing communication between a client device 110 and the third party system 130 and an application-specific identifier associated with the token. The notification management module 230 identifies a user profile including or associated with the application-specific identifier and stores the token in the identified user profile. Storing application-specific identifiers in association with information authorizing communication between the client device 110 executing the application and the third party system 130 allows the online system 140 to regulate communication of notifications to a client device 110 executing the application based on the user accessing the application (e.g., when a user associated with the application-specific identifier associated with the information authorizing communication between the client device 110 accesses the application, notifications are communicated, but are not communicated when a user associated with a different application-specific identifier accesses the application). Additionally, the notification management module 230 may receive a combination of an application-specific identifier and a device identifier from the third party system 130 and information authorizing communication between the third party system 130 and an application when the user corresponding to the application-specific identifier accesses the application via a client device 110 corresponding to the device identifier. The online system 140 then stores the information authorizing communication between the third party system 130 and the application-specific identifier executing on the client device 110 corresponding to the device identifier in a user profile including the application-specific identifier and the device identifier.

In addition to storing information authorizing communication between users of the online system 140 and the third party system 130, the notification management module 230 may transmit notifications from the third party system 130 to various users of the online system 140. Because the online system 140 maintains various types of information associated with its users, the notification management module 230 allows the third party system 130 to leverage information associated with users by the online system 140 to distribute notifications to users. However, the notification management module 230 maintains the privacy of the online system users by transmitting notifications from the third party system 130 to online system users rather than allowing the third party system 130 to access information associated with users by the online system 140 or identifying online system users satisfying specified criteria to the third party system 130. Hence, the notification management module 230 receives a request from the third party system 130 to communicate a notification to users of the online system 140 satisfying at least a threshold number of criteria included in the request. One or more criteria may be included in the request or may be communicated to the notification management module 230 by the third party system 130 for storage by the notification management module 230 in association with the third party system 130. The criteria specify one or more characteristics of users eligible to be presented with a notification included in the request or otherwise identified by the third party system 130. Associating different criteria with different notifications allows the third party system 130 to tailor presentation of various notifications to users of the online system 130 who authorized communication with the third party system 130 and who have specific characteristics, allowing notifications including different content to be presented to users of the online system 140 having different characteristics. For example, criteria specify demographic information, connections, or actions associated with a user. In some embodiments, criteria may be associated with multiple notifications from the third party system 130.

In one embodiment, criteria may specify actions or types of connections between a user and another user or an object of the online system 140. Criteria may also specify interactions between a user and objects performed external to the online system 140, such as on the third party system 130. For example, criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in criteria allows the third party system 130 to further refine users eligible to be presented with various notifications. As another example, the criteria identifies users having a connection to another user or object or having a particular type of connection to another user or object.

The notification management module 230 identifies user profiles from the user profile store 205 including information authorizing communication between the third party system 130 and a client device 110 corresponding to a device identifier in the user profile and selects a set of the identified user profiles associated with characteristics satisfying at least the threshold number of criteria included in the request. The notification is communicated by the notification management module 230 to client devices 110 associated with users associated with the set of identified user profiles. For example, the notification management module 230 transmits the notification to a client device 110 corresponding to a device identifier in an identified user profile that is associated with information authorizing communication between a client device 110 and the third party system 130; however, the notification management module 230 does not transmit the notification to client devices 110 that do not correspond to the device identifier associated with information authorizing communication between the client device 110 and the third party system. As another example, the notification management module 230 transmits the notification to one or more client devices 110 on which a user corresponding to an application-specific identifier associated with information authorizing communication between the application and the third party system 130 accesses an application. Additionally, the notification management module 230 transmits the notification to a client device 110 corresponding to a device identifier associated with information authorizing communication with the client device 130 and executing an application corresponding to an application-specific identifier associated with the information authorizing communication between the client device 110 and the third party system 130. In some embodiments, the online system 140 communicates a confirmation to the third party system 130 that the notifications have been sent to users associated with the identified user profiles. Additionally, the notification management module 230 may select a communication channel used to communicate a notification to a user associated with an identified user profile. For example, the notification management module 230 retrieves information from an identified user profile specifying one or more communication channel preferences or describing usage histories of various communication channels by the user associated with the identified user profile and selects a communication channel for transmitting the notification to the user based on the information retrieved from the identified user profile. As an example, the notification management module 230 identifies a preference for a specific communication channel from the identified user profile and transmits the notification to the user via the specific communication channel to increase the likelihood of the user viewing or accessing the notification. Selection of user profiles and communication of a notification to users associated with the selected user profiles is further described below in conjunction with FIG. 3.

The content selection module 235 selects one or more content items for communication to a client device 110 to be presented to a viewing user. Content items eligible for presentation to the viewing user are retrieved from the content store 210, or from another source, by the content selection module 235, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 235 includes content items eligible for presentation to the viewing user in one or more selection processes, which identify a set of content items for presentation to the viewing user. For example, the content selection module 235 determines a measure of relevance of various content items to the user based on characteristics associated with the user by the social networking system 140 based on the user's affinity for different content items and selects content items for presentation to the user based on the determined measures of relevance. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with various content items when selecting content for presentation to the viewing user. In various embodiments, the content selection module 235 determines an expected value associated with various content items based on their bid amounts and selects content items associated with a maximum expected value or associated with at least a threshold expected value for presentation. An expected value associated with a content item represents an expected amount of compensation to the social networking system 140 for presenting a content item. For example, the expected value associated with an ad request is a product of the ad request's bid amount and a likelihood of the user interacting with the ad content from the ad request. The content selection module 235 may rank ad requests based on their associated expected values and select ad requests having at least a threshold position in the ranking for presentation to the user. In some embodiments, the content selection module 235 may rank both content items and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

In various embodiments, the content selection module 235 presents content to a user through a feed including multiple content items. For example, the feed includes content items describing actions performed by users of the online system 140 as well as ad content from one or more ad requests selected for presentation to a user. The content selection module 235 may also determine the order in which selected content items or advertisements are presented via the feed. For example, the content selection module 235 orders content items or advertisements in the feed based on likelihoods of the user interacting with various content items or ad requests.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Communicating Notifications from a Third Party System via an Online System

Figure 3:
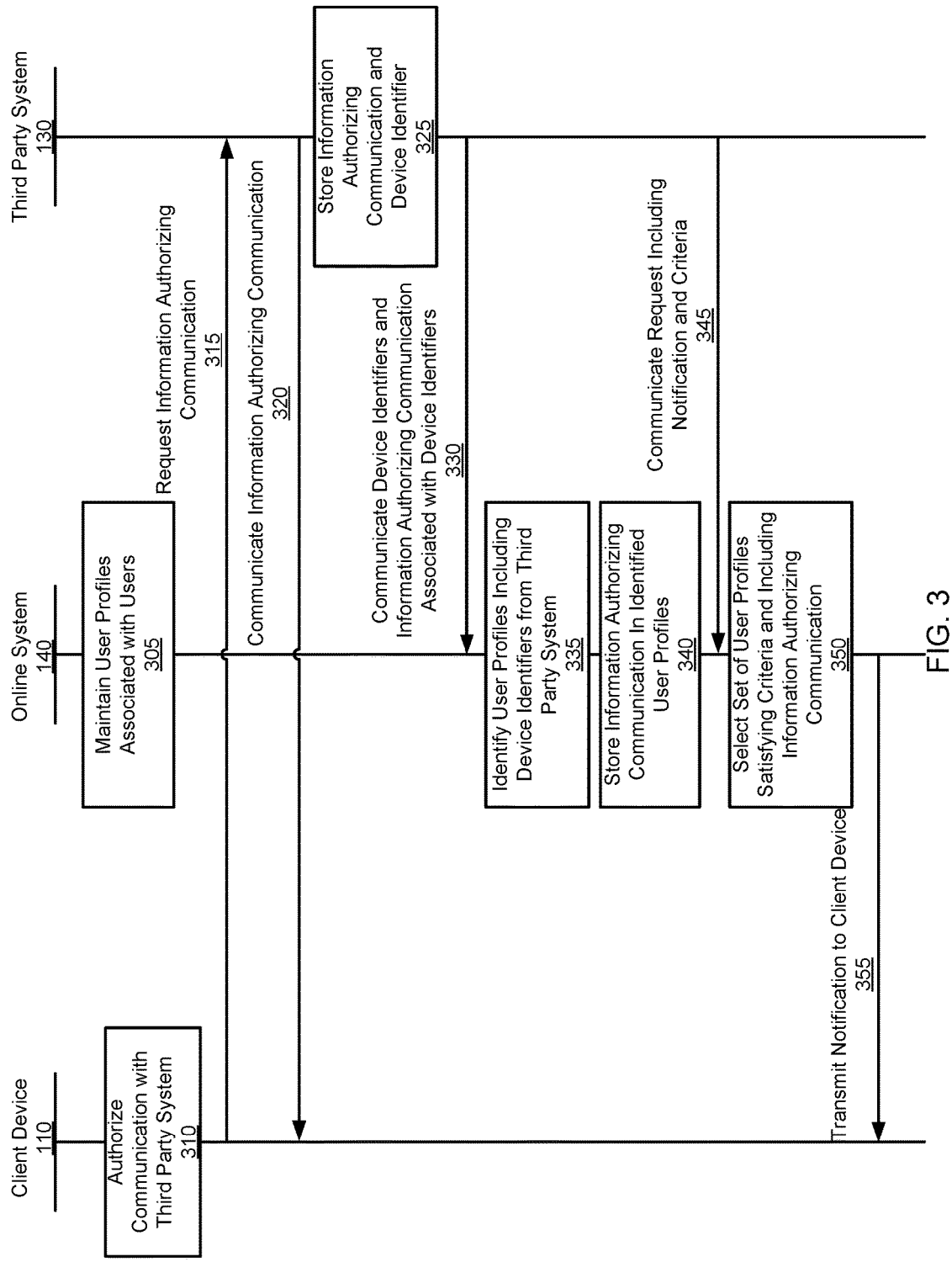
FIG. 3 is an interaction diagram of a method for communicating notifications from a third party system to users via an online system, in accordance with an embodiment.

FIG. 3 is an interaction diagram of a method for communicating notifications from a third party system 130 to users via an online system 140. In other embodiments, the method may include different and/or additional steps than those shown in FIG. 3. Additionally, steps of the method may be performed in different orders than the order described in conjunction with FIG. 3.

The online system 140 maintains 305 user profiles associated with each user of the online system 140. A user profile associated with a user by the online system 140 includes declarative information about the user that was explicitly shared by the user and may also include information inferred by the online system 140. Examples of information stored in a user profile include biographic, demographic, and other types of descriptive information, such as work experience, educational history, gender, hobbies or preferences, location and the like. Additionally, a user profile includes a device identifier associated with a user that identifies a client device 110 associated with the user. For example, the device identifier is an alphanumeric string associated with a client device 110 and uniquely identifying the client device 110. The device identifier may be an electronic serial number (ESN), an international mobile station equipment identity (IMEI) number, or other information uniquely identifying a client device 110. However, any suitable information uniquely identifying a client device 110 associated with a user may be included in the user profile. Multiple device identifiers may be included in a user profile to identify different client devices 110 associated with a user. In some embodiments, the device identifier is included in a user profile based on information received by the online system 140 when the user installs an application associated with the online system 140 on a client device 110. Information received by the online system 140 when the user installs the application associated with the online system 140 includes the device identifier associated with the client device 110 and information identifying the user to the online system 140 (e.g., a user name or other information used by the online system 140 to identify the user). The online system 140 retrieves a user profile associated with the information identifying the user to the online system 140 and stores the device identifier associated with the client device 110 in the user profile. In various embodiments, the online system 140 receives an application-specific identifier associated with the user by the application when the user installs the application on a client device 110 and stores the application-specific identifier in the user profile.

When a user of the online system 140 authorizes 310 communication between a client device 110 and a third party system 130, the client device 110 requests 315 information authorizing communication between the third party system 130 and the client device 110 from the client device 110. For example, when a user of the client device 110 authorizes 310 an application associated with a third party system 130 to present notifications to the user via the client device 110, the client device 110 requests 315 information authorizing communication between the third party system 130 and the client device 110 from the third party system 130. When requesting information authorizing communication between the third party system 130, the client device 110 includes a device identifier associated with the client device 110 in the request communicated to the third party system 130. In some embodiments, the client device 110 requests 315 information authorizing communication between the third party system 130 and an application-specific identifier or between the third party system 130 and a combination of a device identifier and an application-specific identifier. The device identifier and/or the application-specific identifier is included in the request communicated to the third party system in the preceding examples. The third party system 130 generates the information authorizing communication between the third party system 130 and the client device 110 and communicates 320 the information to the client device 110, which locally stores the information authorizing communication between the third party system 130 and the client device 110. For example, the third party system 130 generates a token based at least in part on the device identifier and communicates 320 the token to the client device 110 for storage and association with the application associated with the third party system 130. In other embodiments, the third party system 130 generates the token based at least in part on the application-specific identifier or on the combination of the application-specific identifier and the device identifier. Additionally, the third party system 130 stores 325 the information authorizing communication between the client device 110 and the third party system 130 in association with the device identifier associated with the client device 110.

After storing 325 information authorizing communication between various client devices 110 and the third party system 130, the third party system 130 communicates 330 information identifying one or more device identifiers associated with client devices 110 and authorizing communication between the client devices 110 and the third party system 130. In various embodiments, the third party system 130 communicates 330 device identifiers each associated with information authorizing communication between a client device 110 corresponding to the device identifier to the online system 140. For example, the third party system 130 communicates 330 pairings of device identifiers and tokens, where a device identifier is associated with a token (or other information authorizing communication between the client device 110 corresponding to the device identifier and the third party system 130) to the online system 140. In some embodiments, the third party system 130 communicates the device identifiers and information authorizing communication between client devices 110 and the third party system 130 after storing at least a threshold number of device identifiers. Alternatively, the third party system 130 communicates a device identifier and information authorizing communication between the third party system 130 and a client device 110 corresponding to the device identifier to the online system 140 after storing 325 the device identifier and the information authorizing communication between the third party system 130 and the client device 110 corresponding to the device identifier to the online system 140.

The online system 140 identifies 335 user profiles maintained 305 by the online system 140 that each include a device identifier included in the information received from the third party system 130. If a user profile includes multiple device identifiers, the online system 140 identifies a user profile having at least one device identifier matching a device identifier included in the information received from the third party system 130. In some embodiments, the user profile associates a type with various device identifiers (e.g., primary, secondary, etc.) and identifies 335 user profiles having a device identifier associated with a specific type and matching a device identifier included in the information received from the third party system 130. For each identified user profile, the online system 140 stores 340 information authorizing communication between the third party system 130 and a client device 110 corresponding to a device identifier included in the information received from the third party system 130. As an example, the online system 140 stores 340 a token associated with a device identifier an identified user profile including the device identifier. Storing 340 information authorizing communication between the third party system 130 and a client device 110 in user profiles maintained 305 by the online system 140 allows the online system 140 to identify users of the online system 140 who have authorized communication between the third party system 130 and a client device 110. In other embodiments, the online system 140 stores 340 a token associated with an application-specific identifier in user profiles maintained by the online system 140 identify users of applications who have authorized communication between the third party systems 130 and an application or stores 340 a token associated with a combination of application-specific identifier and a device identifier to identify users who have authorized communication between the third party system 130 and an account used to access an application executing on a specific client device 130.

With information identifying online system users who authorized communication between the third party system 130 and client devices 110 associated with the users maintained by the online system 140, information associated with the online system users 140 by the online system 140 may be used by the third party system 130 to communicate notifications to the online system users. The third party system 130 communicates 345 a request to the online system 140 including a notification and criteria specifying characteristics of users to receive the request; hence, the notification is to be communicated to users of the online system 140 having characteristics satisfying at least a threshold number of the criteria included in the request. Criteria included in the request from the third party system 130 may identify demographic characteristics (e.g., location, age, occupation, educational history, gender, etc.), actions (e.g., sharing a content item with an additional user, indicating a preference for a content item, providing a comment associated with a content item), performed within a specified time interval, connections between a user and additional users or objects, or any other suitable information associated with users. Various combinations of information associated with the users may be specified by the request, allowing the third party system 130 to define an audience of users having specific characteristics specified by the request to receive the notification.

After receiving the request, the online system 140 selects 350 a set of user profiles, where each user profile in the set is associated with criteria satisfying at least a threshold number of the criteria in the request and includes information authorizing communication between the third party system 130 and a client device 110 corresponding to a device identifier included in the user profile (or including information authorizing communication between the third party system 130 and an application-specific identifier used to access an application associated with the third party system 130, or including information authorizing communication between the third party system 130 and a combination of a device identifier and an application-specific identifier). For example, if the request includes criteria specifying an age range of 18-25, a gender of male, and a location of Raleigh, N.C., the online system 140 selects 350 user profiles including information identifying male users between 18-25 and a location of Raleigh, N.C. that also include information authorizing communication between the third party system 130 and a client device 110 corresponding to one or more device identifiers included in the user profile. In other examples, the criteria identify one or more types of actions performed by online system users within a specified time interval, identify combinations of demographic information and actions associated with users, or identify any other suitable information to identify online system users. The online system 140 then transmits 355 the notification to client devices 110 associated with users included in the identified set of user profiles. The notification transmitted 355 to a client device 110 includes the information authorizing communication between the client device 110 and the third party system 130 as well as content, allowing the client device 110 to verify the notification is associated with the third party system through the information authorizing communication between the client device 110 and the third party system 130. Hence, the online system 140 determines whether a user profile associated with a user includes information authorizing communication between the third party system 130 and a client device 110 corresponding to a device identifier in the user profile and also is associated with at least a threshold number of characteristics satisfying criteria included in the request. If the online system 140 determines the user profile associated with the user includes information authorizing communication between the third party system 130 and the client device 110 corresponding to the device identifier in the user profile and also is associated with at least a threshold number of characteristics satisfying criteria included in the request, the online system 140 transmits 355 the notification to the client device 110 corresponding to the device identifier. The online system 140 may communicate a confirmation to the third party system 130 after transmitting 355 notifications to the client devices 110 associated with users in the identified set of user profiles or may communicate a confirmation to the third party system 130 after transmitting 335 notifications to client devices 110 associated with different users in the identified set of user profiles. However, the online system 140 may communicate a confirmation to the third party system after any transmission of the notifications by the online system 140 satisfies any suitable criteria.

In some embodiments, the online system 140 determines a type of communication channel used to transmit 355 the notification to various users. For example, the online system 140 identifies a communication channel specified by a user profile in the set of user profiles and transmits 355 the notification to a client device corresponding to a client device identifier in the user profile via the communication channel specified by the user profile. Example communication channels include e-mail, text messaging, multimedia messaging, voice messaging, and push notification messaging. Accounting for information in a user profile identifying a communication channel allows the online system 140 to communicate the notification to a user through a communication channel most likely to be accessed by the user. The online system 140 may reformat the notification included in the request for communication via the identified communication channel or may request a reformatted notification from the third party system 130 based on the identified communication channel and transmits 355 the reformatted notification to the client device 110 when it is received from the third party system 130. Alternatively, the online system 140 transmits 355 the notification to the client device 110 using a communication channel specified by the third party system 130 in the request.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by an online system from a third party system, a device identifier associated with an authorization that allows communication from the third party system to a client device of a user of the online system, the client device being identified by the device identifier and the authorization being generated by the third party system in response to a request from the client device that authorized communication from the third party system to the client device;
   storing, by the online system in a user profile associated with the user of the online system, the authorization allowing communication from the third party system to the client device identified by the device identifier;
   receiving, at the online system, a request from the third party system to communicate a notification to the user of the online system;
   determining that the online system is authorized to communicate the notification to the user of the online system on behalf of the third party system based on the stored authorization allowing communication from the third party system to the client device; and
   subsequent to determining that the online system is authorized, transmitting the notification to the client device associated with the user of the online system.

2. The method of claim 1, wherein storing the authorization comprises storing the authorization with a user profile belonging to the user of the online system and wherein determining that the online system is authorized to communicate the notification to the user of the online system comprises accessing the stored authorization in the user profile.

3. The method of claim 2, wherein the notification is transmitted to the client device via a communication channel specified by the user profile belonging to the user of the online system.

4. The method of claim 1, wherein the authorization that allows communication from the third party system to a client device is a token, wherein the token is generated by the third party system based at least in part on the device identifier.

5. The method of claim 1, further comprising prior to storing the authorization allowing communication from the third party system to the client device, identifying the user profile associated with the user of the online system based on a device identifier stored in the user profile.

6. The method of claim 1, wherein the request from the third party system includes a plurality of criteria each specifying a characteristic of a user of the online system that is eligible to be presented with the notification.

7. The method of claim 6, further comprising determining that the user of the online system satisfies a threshold number of the plurality of criteria by accessing information in the user profile belonging to the user of the online system.

8. The method of claim 6, wherein the characteristic of the user of the online system that is eligible to be presented with the notification is one of demographic information, actions performed by the user, connections between the user and additional users of the online system, and any combination thereof.

9. The method of claim 1, wherein the authorization is further associated with an application-specific identifier, wherein the authorization that allows communication from the third party system to the client device further comprises an authorization allowing communication from the third party system to an application installed on the client device and identified by the application-specific identifier.

10. The method of claim 1, further comprising:
    subsequent to transmitting the notification to the client device, communicating, by the online system, a confirmation to the third party system, the confirmation indicating the transmission of the notification to the client device.

11. A non-transitory computer readable medium comprising instructions that, when executed by a processor, cause the processor to:
    receive, by an online system from a third party system, a device identifier associated with an authorization that allows communication from the third party system to a client device of a user of the online system, the client device being identified by the device identifier and the authorization being generated by the third party system in response to a request from the client device that authorized communication from the third party system to the client device;
    store, by the online system in a user profile associated with the user of the online system, the authorization allowing communication from the third party system to the client device identified by the device identifier;
    receive, at the online system, a request from the third party system to communicate a notification to the user of the online system;
    determine that the online system is authorized to communicate the notification to the user of the online system on behalf of the third party system based on the stored authorization allowing communication from the third party system to the client device; and
    subsequent to the determination that the online system is authorized, transmit the notification to the client device associated with the user of the online system.

12. The non-transitory computer readable medium of claim 11, wherein the instructions that cause the processor to store the authorization further comprises instructions that, when executed by the processor, cause the processor to store the authorization with a user profile belonging to the user of the online system and wherein the instructions that cause the processor to determine that the online system is authorized to communicate the notification to the user of the online system further comprises instructions that, when executed by the processor, cause the processor to access the stored authorization in the user profile.

13. The non-transitory computer readable medium of claim 12, wherein the notification is transmitted to the client device via a communication channel specified by the user profile belonging to the user of the online system.

14. The non-transitory computer readable medium of claim 11, wherein the authorization that allows communication from the third party system to a client device is a token, wherein the token is generated by the third party system based at least in part on the device identifier.

15. The non-transitory computer readable medium of claim 11, further comprising instructions that, when executed by the processor, cause the processor to:
  prior to store the authorization that allows communication from the third party system to the client device, identify the user profile associated with the user of the online system based on a device identifier stored in the user profile.

16. The non-transitory computer readable medium of claim 11, wherein the request from the third party system includes a plurality of criteria each specifying a characteristic of a user of the online system that is eligible to be presented with the notification.

17. The non-transitory computer readable medium of claim 16, further comprising instructions that, when executed by the processor, cause the processor to determine that the user of the online system satisfies a threshold number of the plurality of criteria by accessing information in the user profile belonging to the user of the online system.

18. The non-transitory computer readable medium of claim 16, wherein the characteristic of the user of the online system that is eligible to be presented with the notification is one of demographic information, actions performed by the user, connections between the user and additional users of the online system, and any combination thereof.

19. The non-transitory computer readable medium of claim 11, wherein the authorization is further associated with an application-specific identifier, wherein the authorization that allows communication from the third party system to the client device further comprises an authorization allowing communication from the third party system to an application installed on the client device and identified by the application-specific identifier.

20. The non-transitory computer readable medium of claim 11, further comprising instructions that, when executed by the processor, cause the processor to:
  subsequent to the transmission of the notification to the client device, communicate, by the online system, a confirmation to the third party system, the confirmation indicating the transmission of the notification to the client device.

* * * * *